United States Patent
Kang et al.

(10) Patent No.: US 10,754,003 B2
(45) Date of Patent: Aug. 25, 2020

(54) METHOD FOR DETERMINING THE POSITION OF MOBILE NODE AND RELATED COMMUNICATION SYSTEM, ROAD SIDE UNIT, AND VEHICLE THEREOF

(71) Applicant: Industrial Technology Research Institute, Hsinchu (TW)

(72) Inventors: Po-Chun Kang, Hsinchu County (TW); Tzu-Hsiang Su, Taichung (TW); Kuo-Huang Hsu, Taoyuan (TW); Pei-Chuan Tsai, Hsinchu County (TW); Yi-Jing Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/115,482

(22) Filed: Aug. 28, 2018

(65) Prior Publication Data

US 2019/0187235 A1 Jun. 20, 2019

(30) Foreign Application Priority Data

Dec. 20, 2017 (TW) .............................. 106144813 A

(51) Int. Cl.
*H04W 4/46* (2018.01)
*G01S 5/00* (2006.01)
(Continued)

(52) U.S. Cl.
CPC ............ *G01S 5/0036* (2013.01); *G01C 21/28* (2013.01); *G01S 5/0289* (2013.01); *G01S 13/42* (2013.01);
(Continued)

(58) Field of Classification Search
CPC .............................. H04W 4/46; G01S 5/0036
(Continued)

(56) References Cited

U.S. PATENT DOCUMENTS 5,091,726 A 2/1992 Shyu
6,160,493 A 12/2000 Smith
(Continued)

FOREIGN PATENT DOCUMENTS

CN 101727757 A 6/2010
CN 204256943 U 4/2015
(Continued)

OTHER PUBLICATIONS

Schoepflin et al., "Dynamic Camera Calibration of Roadside Traffic Management Cameras for Vehicle Speed Estimation," IEEE Transactions on Intelligent Transportation Systems, Jun. 2003, pp. 90-98, vol. 4, No. 2, IEEE, US.

(Continued)

*Primary Examiner* — Chuck Huynh

(57) ABSTRACT

A method for determining the position of a mobile node applied to a roadside unit (RSU) is provided. The RSU and a plurality of mobile nodes form a communication network of a road. The method includes the steps of: obtaining, by, via at least one sensor, first road information, wherein the first road information provides absolute position distribution information associated with the mobile nodes; receiving, by a communication device, second road information from a first mobile node of the mobile nodes, wherein the second road information provides relative position distribution information associated with the first mobile node and second mobile nodes adjacent to the first mobile node; and determining, by a comparison device, the position of the first mobile node on the road according to the first road information and the second road information.

29 Claims, 12 Drawing Sheets

(51) Int. Cl.
| | |
|---|---|
| *G01S 5/02* | (2010.01) |
| *H04W 4/44* | (2018.01) |
| *G01C 21/28* | (2006.01) |
| *H04W 4/02* | (2018.01) |
| *G08G 1/01* | (2006.01) |
| *G01S 13/91* | (2006.01) |
| *G08G 1/017* | (2006.01) |
| *G01S 13/42* | (2006.01) |

(52) U.S. Cl.
CPC .............. *G01S 13/91* (2013.01); *G08G 1/017* (2013.01); *G08G 1/0141* (2013.01); *H04W 4/026* (2013.01); *H04W 4/027* (2013.01); *H04W 4/44* (2018.02); *H04W 4/46* (2018.02)

(58) Field of Classification Search
USPC ...................................................... 455/456.1
See application file for complete search history.

(56) References Cited

U.S. PATENT DOCUMENTS

| | | | |
|---|---|---|---|
| 7,499,675 B2 | 3/2009 | Tsuzuki et al. | |
| 8,718,055 B2 | 5/2014 | Vasseur et al. | |
| 9,305,462 B2 | 4/2016 | Rubin et al. | |
| 2007/0100537 A1 | 5/2007 | Parikh et al. | |
| 2007/0244643 A1 | 10/2007 | Tengler et al. | |
| 2010/0100324 A1 | 4/2010 | Caminiti et al. | |
| 2010/0198513 A1* | 8/2010 | Zeng | B60W 40/02 701/300 |
| 2011/0184646 A1 | 7/2011 | Wong et al. | |
| 2011/0238306 A1 | 9/2011 | Miucic | |
| 2013/0188513 A1 | 7/2013 | Vasseur et al. | |
| 2014/0104077 A1 | 4/2014 | Engel et al. | |
| 2014/0314235 A1* | 10/2014 | Matischek | H04N 1/4486 380/243 |
| 2015/0032362 A1 | 1/2015 | Goudy et al. | |
| 2016/0203651 A1* | 7/2016 | Heath | G06Q 50/30 705/13 |

FOREIGN PATENT DOCUMENTS

| | | |
|---|---|---|
| CN | 105741546 A | 7/2016 |
| DE | 102015221183 A1 | 5/2017 |
| EP | 2446294 B1 | 3/2015 |
| EP | 2807866 B1 | 1/2016 |
| TW | 201017594 | 12/2005 |
| TW | M300635 U | 1/2006 |
| TW | I336669 | 2/2011 |
| TW | M499362 U | 4/2015 |
| TW | I557006 | 11/2016 |
| WO | WO 2011115920 A1 | 9/2011 |
| WO | WO 2013112825 A1 | 8/2013 |
| WO | WO 2017/171908 A1 | 10/2017 |

OTHER PUBLICATIONS

Togashi et al., "Lane recognition for moving vehicles using multiple on-car RFID receiver antennas—Algorithm and its experimental results," 2012 Intelligent Vehicles Symposium, Jun. 2012, pp. 975-981, IEEE, US.

Lu et al., "The Dedicated Short-Range Vehicle Tracking," 2010 IEEE 71st Vehicular Technology Conference, May 2010, 5 pages, IEEE, US.

Okada et al., "Multisensor Vehicle Tracking Method for Intelligent Highway System," Proceedings of the 39th SICE Annual Conference. International Session Papers SICE 2000, Jul. 2000, pp. 291-296, IEEE, US.

Hohman et al., "GPS Roadside Integrated Precision Positioning System," Position Location and Navigation Symposium IEEE 2000, Mar. 2000, pp. 221-230, IEEE, US.

Edelmayer et al., "Cooperative federated filtering approach for enhanced position estimation and sensor fault tolerance in ad-hoc vehicle networks," IET Intelligent Transport Systems, Jan. 2009, pp. 82-92, vol. 4, Issue 1, The Institution of Engineering and Technology, US.

Luo et al., "A Study of the High-speed Vehicle Real-time Accurate Positioning Algorithm," The 26th Chinese Control and Decision Conference, May 2014, pp. 4730-4735, IEEE, US.

Shi et al., "Laser-and-Vision based Probe Car System Toward Realtime Lane-based Traffic Data Collection, 2012 12th International Conference on ITS Telecommunications, Nov. 2012, pp. 616-620, IEEE, US.

Miller et al., "An Adaptive Peer-to-Peer Collision Warning System," IEEE 55th Vehicular Technology Conference, May 2002, pp. 317-321, IEEE, US.

European Patent Office, Search Report, Application No. 18192652.8, dated Apr. 5, 2019, Europe.

Taiwan Patent Office, Office Action, Patent Application Serial No. 106144813, dated Sep. 13, 2018, Taiwan.

* cited by examiner

METHOD FOR DETERMINING THE POSITION OF MOBILE NODE AND RELATED COMMUNICATION SYSTEM, ROAD SIDE UNIT, AND VEHICLE THEREOF

CROSS REFERENCE TO RELATED APPLICATIONS

This application claims priority from Taiwan Patent Application No. 106144813, filed on Dec. 20, 2017, the disclosure of which is incorporated herein by reference in its entirety.

TECHNICAL FIELD

The present disclosure relates to a communication system related vehicle communication technology and a method for determining the position of a mobile node thereof.

BACKGROUND

With the development of vehicular communication technology, such as vehicle-to-vehicle (V2V), vehicle-to-roadside (V2R) and other communications technologies for information exchange and sharing, and as this technology is becoming increasingly sophisticated, driving safety systems with vehicular communication technology applications have become more popular. Through the above-mentioned vehicular communications technology, intelligent cooperation and coordination between vehicles and between vehicle and Road Side Units (RSUs) is ensured to provide different vehicular application services. In addition, with the front and rear vehicular service system and car network connection, the driver can be provided with information about the condition of the vehicle, vehicle anomaly warnings, driver behavior analysis, and so on, which can reduce accidents and the impact of traffic on the environment.

The V2R communication-based driving safety systems mostly monitor the driving environment of vehicles within a region through the RSU, and send warning messages to vehicles within the region whenever necessary, so as to warn vehicles that need to be warned about such issues as road conditions ahead, traffic accidents, cooperative collision, etc. However, the warning messages of existing V2R or V2X communication-based driving safety systems are usually broadcast to all of the vehicles in the region. This may cause the driver of a vehicle that does not need to be warned to become distracted by the display of the unneeded warning message. This is likely to lead to traffic safety concerns in addition to causing an inconvenience to the driver.

SUMMARY

A communication system and a method for determining the position of a mobile node thereof are provided in the disclosure.

In an embodiment, a method for determining the position of a mobile node, applied to a roadside unit (RSU), wherein the RSU and a plurality of mobile nodes form a communication network on a road, the method comprising: obtaining, by at least one sensor, first road information, wherein the first road information provides absolute position distribution information associated with the mobile nodes; receiving, by a communication device, second road information from a first mobile node of the mobile nodes, wherein the second road information provides relative position distribution information associated with the first mobile node and second mobile nodes adjacent to the first mobile node; and determining, by a comparison device, a position of the first mobile node on the road according to the first road information and the second road information.

In an embodiment, a method for determining the position of a mobile node, applied to the mobile node, wherein the mobile node and a roadside unit (RSU) form a communication network on a road, the method comprising: receiving, by a communication device, first road information from the RSU, wherein the first road information provides absolute position distribution information associated with the mobile node and a plurality of neighboring mobile nodes; obtaining, by at least one sensor, second road information, wherein the second road information provides relative position distribution information associated with the mobile node and the neighboring mobile nodes; and determining, by a comparison device, the position of the mobile node on the road according to the first road information and the second road information.

In an embodiment, a communication system, comprising: a first mobile node and a plurality of second mobile nodes, wherein the second mobile nodes are adjacent to the first mobile node; and a roadside unit (RSU), wherein the RSU, the first mobile node and the mobile nodes form a communication network on a road; wherein the RSU obtains first road information by at least one sensor, receives second road information from a first mobile node by a communication device and determines the position of the first mobile node on the road according to the first road information and the second road information by a comparison device; wherein the first road information provides absolute position distribution information associated with the first mobile node and the second mobile nodes, and the second road information provides relative position distribution information associated with the first mobile node and the second mobile nodes.

In an embodiment, a roadside unit (RSU), used to communicate with a plurality of mobile nodes to form a communication network on a road, comprising: at least one sensor; a communication device, used for signal transmission and reception with the mobile nodes; a comparison device; and a processor, coupled to the sensor, the communication device, and the comparison device, used to obtain first road information by at least one sensor, receive second road information from a first mobile node of the mobile nodes by the communication device, and determine the position of the first mobile node on the road according to the first road information and the second road information by the comparison device; wherein the first road information provides absolute position distribution information associated with the first mobile node and the second mobile nodes, and the second road information provides relative position distribution information associated with the first mobile node and the second mobile nodes.

In an embodiment, a vehicle, used to communicate with a roadside unit (RSU) and a plurality of neighboring vehicles to form a communication network on a road, comprising: at least one sensor; a communication device, used for signal transmission and reception with the RSU and the neighboring vehicles; a comparison device; and a processor, coupled to the sensor, the communication device, and the comparison device, used to obtain first road information from the RSU by the communication device and receive second road information by the sensor and determine the position of the vehicle on the road according to the first road information and the second road information by the comparison device; wherein the first road information provides absolute position distribution information associated with the vehicle and the neighboring vehicles, and the second road information provides relative position distribution information associated with the vehicle and the neighboring vehicles.

The methods disclosed above may be practiced by the devices or systems disclosed above which are hardware or firmware capable of performing particular functions and may take the form of program code embodied in a memory and/or embodied in a computer-readable storage medium/ computer program product, combined with specific hardware. When the program code is loaded into and executed by an electronic device, a controller, a computer processor or a machine, the electronic device, the processor, the computer or the machine becomes an apparatus or system for practicing the disclosed method.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION

Figure 1:
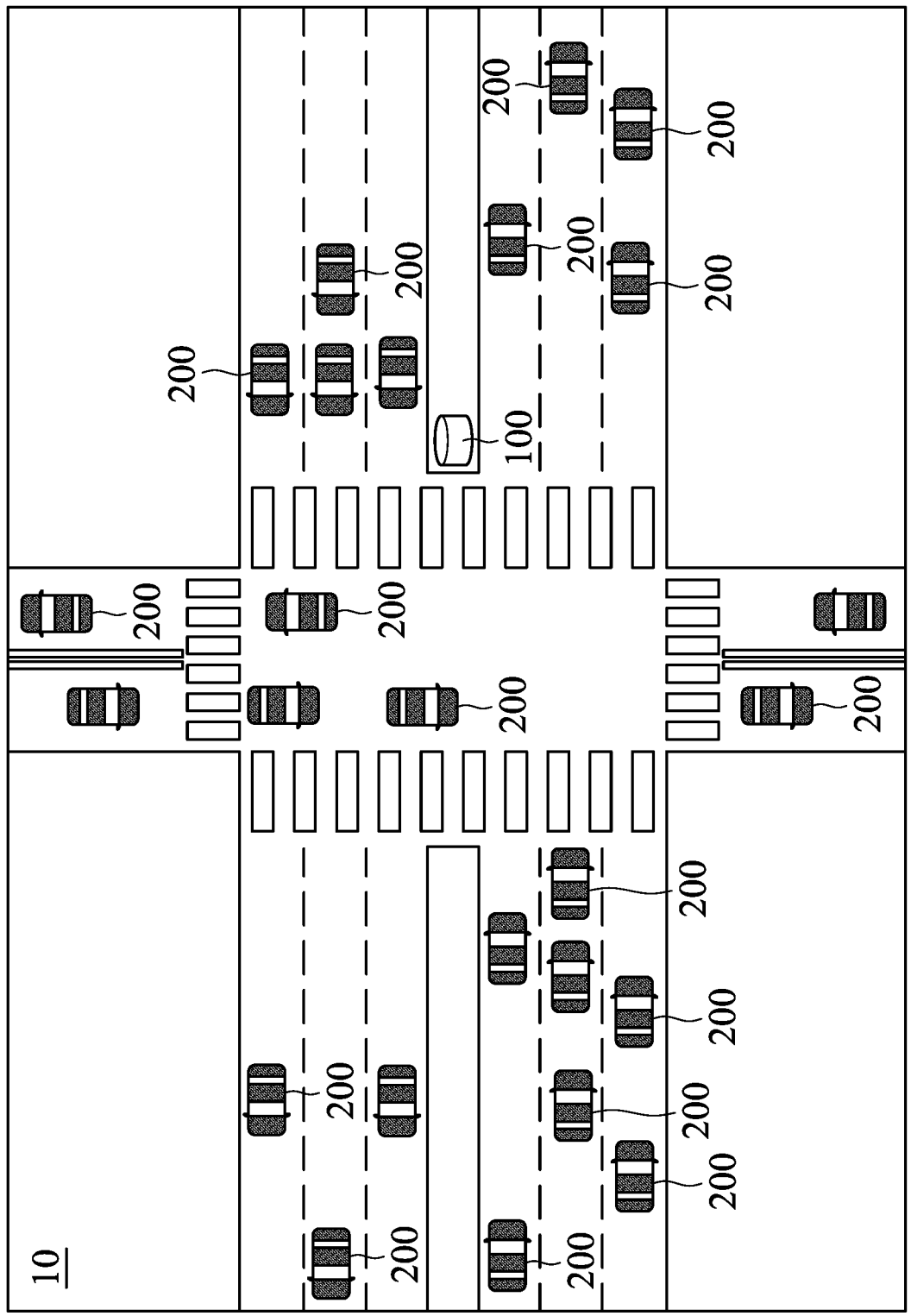
FIG. 1 shows a schematic diagram of a configuration of a communication system according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

The present disclosure provides a communication system and a method for determining the position of a mobile node, which can be applied to a vehicle security system based on vehicle-to-road (V2R) communication, and may achieve the purpose of informing a specific vehicle through the sensor information exchange between mobile nodes such as a vehicle and a RSU. The position of a vehicle which needs to be notified can be determined by using the topology information of the neighboring vehicle generated by vehicles and the road topology information generated by the RSU through a comparison of topology information, so that the RSU may transmit warning messages or notifications to specific drivers. In addition to warning the specific vehicles, the communication system and the method may avoid driving interference caused by information transmitted to other vehicles which do not need to receive the warning message other vehicles. In addition, the communication system and the method may assist the autopilot vehicle in real time to avoid potential collisions. The communication system and the method enhance the development of self-driving vehicles and further assist driving safety.

FIG. 1 shows a schematic diagram of a configuration of a communication system 10 according to one embodiment of the present disclosure. In detail, the communication system 10 is a communication system based on V2R communication. As shown in FIG. 1, the communications system 10 may comprise at least one road side unit (RSU) 100 and a plurality of mobile nodes 200. The RSU 100 is disposed at a fixed position, such as an intersection or a road edge, for communicating with one or more mobile nodes 200 having mobile capabilities. For example, in some embodiments, the RSU 100 may form a V2R communication network with a plurality of mobile nodes 200 to communicate with each other. Each of the mobile nodes 200 may be a vehicle driving on the road, wherein the vehicle is equipped with an OBU or has a communication capability. The neighboring mobile nodes are neighboring vehicles within a sensing range of the mobile node 200. However, those skilled in the art should understand that the disclosure is not limited thereto.

Figure 2:
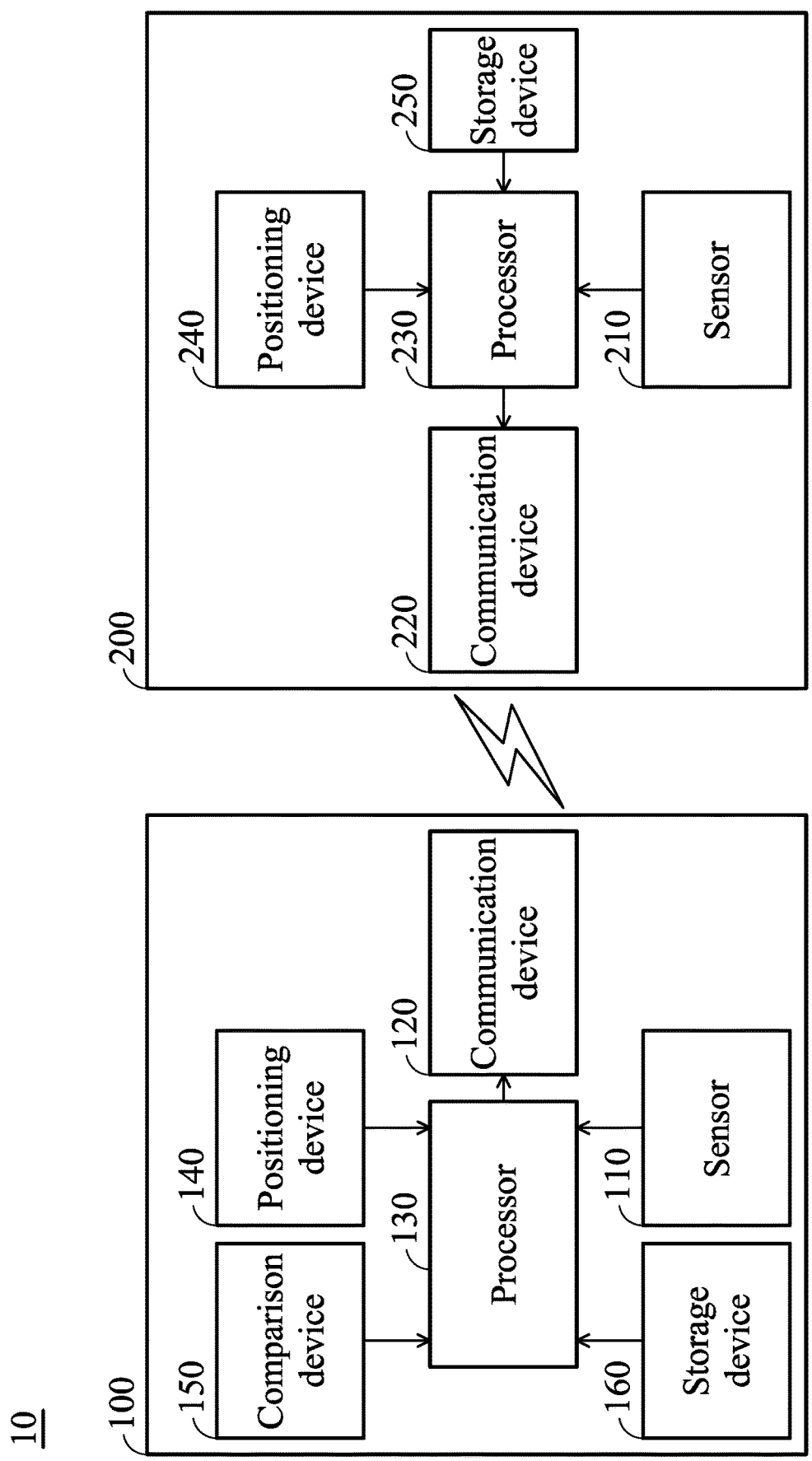
FIG. 2 shows a schematic diagram of system architecture of a communication system according to an embodiment of the present disclosure.

FIG. 2 shows a schematic diagram of system architecture of a communication system 10 according to an embodiment of the present disclosure. As shown in FIG. 2, the RSU 100 includes at least one or more sensors 110, a communication device 120, a processor 130, a positioning device 140, a comparison device 150, and a storage device 160. The sensor 110 (e.g., a radar) periodically senses one or more mobile nodes 200 (e.g., vehicles, pedestrians, etc.) on the road to generate sensor information.

The communication device 120 is configured to receive information transmitted by the mobile nodes on the road. Specifically, the communication device 120 may receive a signal from the current connected network and transmit the signal to the current connected network. The communication device 120 may include a wireless communication module that may be coupled/electrically connected to one or more antennas (not shown in FIG. 1) and may allow a wireless network to communicate with one or more additional devices, computers and/or servers. The RSU 100 may support various communication protocols such as a Code Division Multiple Access system (CDMA), Global System for Mobile Communications (GSM), Enhanced Data GSM Environment (EDGE), High Speed Downlink Packet Access (HSDPA), Wi-Fi (e.g., IEEE 802.11a/b/g/n), Bluetooth and Wi-MAX, and protocols such as email, instant messaging (IM), and smart messaging services and other wireless access technology standards, but the present disclosure is not limited thereto. Specifically, the communication device 120 is coupled/electrically connected to the processor 130 and bi-directionally links with communication devices having the same communication channel and protocol so as to receive external messages such as messages sent by each mobile node 200 and then output received messages to the processor 130, and broadcasts the message (such as notifications or warning messages) output by the processor 130.

The processor 130 may be a general-purpose processor, a micro control unit (MCU), a graphics processing unit (GPU) or a digital signal processor (DSP), or the like, which includes various circuits for providing the functions of data analysis, processing and computing. The processor 130, which is coupled to the sensor 110, the communication device 120, the positioning device 140, the comparing device 150 and the storage device 160, may be used to load and execute a series of instructions and/or program codes from the storage device 160 to control the operations of the sensor 110, the communication device 120, the positioning device 140, the comparison device 150 and the storage device 160 to perform the method for determining the position of the mobile node in the present disclosure, the details of which will be described more in the following paragraphs.

The positioning device 140 can be used to obtain position coordinate information of the current location of the RSU 100. For example, the positioning device 140 may be a Global Positioning System (GPS) sensor (e.g., a GPS receiver). The positioning device 140 connected to the processor 130 is used to receive satellite positioning signals and capture at least coordinates, time, and speed data to obtain a GPS signal. Then, the positioning device 140 generates a GPS position and transmits the GPS position to the processor 130 according to the obtained GPS signal. Since the processor 130 is connected to the positioning device 140, the GPS position of the RSU 100 can be obtained. The comparison device 150 (e.g., a comparator circuit) uses the information transmitted by the mobile node 200 in the first road information, and finds a position of a specific mobile node 200 through a topology information comparison. The comparison device 150 may include a circuit logic, which generally includes a plurality of transistors used to control the operation of the circuit logic for providing the desired functions and operations. The storage device 160 may be a non-volatile storage medium (e.g., Read-Only Memory (ROM), Flash memory, hard disk, or optical disc), or a volatile storage medium (e.g., Random Access Memory (RAM)), or any combination thereof for storing data, such as intermediate data generated during the calculation process and the execution result information and so on. The storage device 160 may also store instruction sets and/or program code modules that can be executed by the processor 130. Generally speaking, program code modules contain routines, programs, objects, components, and so on. The storage device 160 may further store various items of data required for the operation, such as the sensor information, the first road information which represents a road topology, and the second road information from each mobile node 200 which represents the star topology of the neighboring vehicle. It should be noted that the details of the first road information and the second road information can be found in the following description of the embodiments.

Each mobile node 200 comprises at least a sensor 210, a communication device 220, a processor 230, a positioning device 240, and a storage device 250.

The sensor 210 (e.g., a radar) periodically senses driving conditions of one or more neighboring mobile nodes 200 within one or more sensing ranges, and generates sensor information associated with one or more mobile nodes 200 around the sensor 210. The communication device 220 is configured to receive information transmitted by other mobile nodes 200 or the RSU 100 on the road. Specifically, the communication device 220 may receive a signal from the current connected network and transmit the signal to the current connected network. The communication device 220 may include a wireless communication module that may be coupled to one or more antennas (not shown in FIG. 2) and may allow a wireless network to communicate with one or more additional devices, computers and/or servers. The RSU 100 may support various communication protocols such as a Code Division Multiple Access system (CDMA), Global System for Mobile Communications (GSM), Enhanced Data GSM Environment (EDGE), High Speed Downlink Packet Access (HSDPA), Wi-Fi (e.g., IEEE 802.11a/b/g/n), Bluetooth and Wi-MAX, and protocols such as email, instant messaging (IM), and smart messaging services and other wireless access technology standards, but the present disclosure is not limited thereto. Specifically, the communication device 220 is connected to the processor 230 and bi-directionally links with communication devices having the same communication channel and protocol so as to receive external messages (such as messages sent by each mobile node 200 or notifications or warning messages sent by the RSU 100) and then output received messages to the processor 130, and broadcasts the message output by the processor 230 to the outside.

The positioning device 240 can be used to obtain position coordinate information of the current location of the mobile node 200. For example, the positioning device 240 may be a Global Positioning System (GPS) sensor (e.g., a GPS receiver). The positioning device 240 connected to the processor 230 is used to receive satellite positioning signals and capture at least coordinates, time, and speed data to obtain a GPS signal. Then, the positioning device 240 generates a GPS position and transmits the GPS position to the processor 230 according to the obtained GPS signal. Since the processor 230 is connected to the positioning device 240, the GPS position, speed and driving direction of the vehicle driving on the road can be obtained.

The storage device 250 may be a non-volatile storage medium (e.g., Read-Only Memory (ROM), Flash memory, hard disk, or optical disc), or a volatile storage medium (e.g., Random Access Memory (RAM)), or any combination thereof for storing data, such as intermediate data generated during the calculation process and the execution result information and so on. The storage device 250 may also store instruction sets and/or program code modules that can be executed by the processor 230. Generally speaking, program code modules contain routines, programs, objects, components, and so on. The storage device 250 may further store various items of data required for the operation, such as the sensor information and the second road information which represents the star topology of the neighboring vehicle. It should be noted that the details of the second road information can be found in the following description of the embodiments.

The processor 230 may be a general-purpose processor, a micro control unit (MCU), a graphics processing unit (GPU) or a digital signal processor (DSP), or the like, which includes various circuits for providing the functions of data analysis, processing and computing. The processor 230 which is coupled to the sensor 210, the communication device 220, the positioning device 240 and the storage device 250, may be used to load and execute a series of instructions and/or program codes from the storage device 250 to control the operations of the sensor 210, the communication device 220, the positioning device 240 and the storage device 250 to perform the method for determining the position of the mobile node in the present disclosure. Specifically, the processor 230 generates the second road information according to the sensor information from the sensor 210 and periodically transmits the sensor information to the RSU 100 by the communication device 220. In the embodiment, the first road information may represent a road topology and the second road information may represent the star topology of the neighboring vehicles.

Specifically, the RSU 100 uses the sensor 110 to obtain sensor-scanning data, uses the processor 120 to construct the first road information (i.e., the road topology) according to the sensor-scanning data, uses the communication device 130 to receive the second road information (i.e., the star topology of the neighboring vehicle) broadcast by the mobile node 200, uses the comparison device 150 to obtain the topology positions of target vehicles which need to be notified/warned according to the road topology and the star topology of the neighboring vehicle, and notifies or warns the target vehicles with a communication device 130. The mobile node 200 periodically obtains sensor-scanning data from the sensor 210, constructs the second road information according to the sensor-scanning data using the processor 230, transmits the second road information to the RSU 100 and receives notifications or warnings from the RSU 100 using the communication device 220. The details will be described later.

Although they are not shown, the mobile node 200 may further comprise other functional units, such as an Input/Output (I/O) device (e.g., physical button, keyboard, etc.), a display device, an audio device or the like, and the present disclosure is not limited thereto.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

Figure 3:
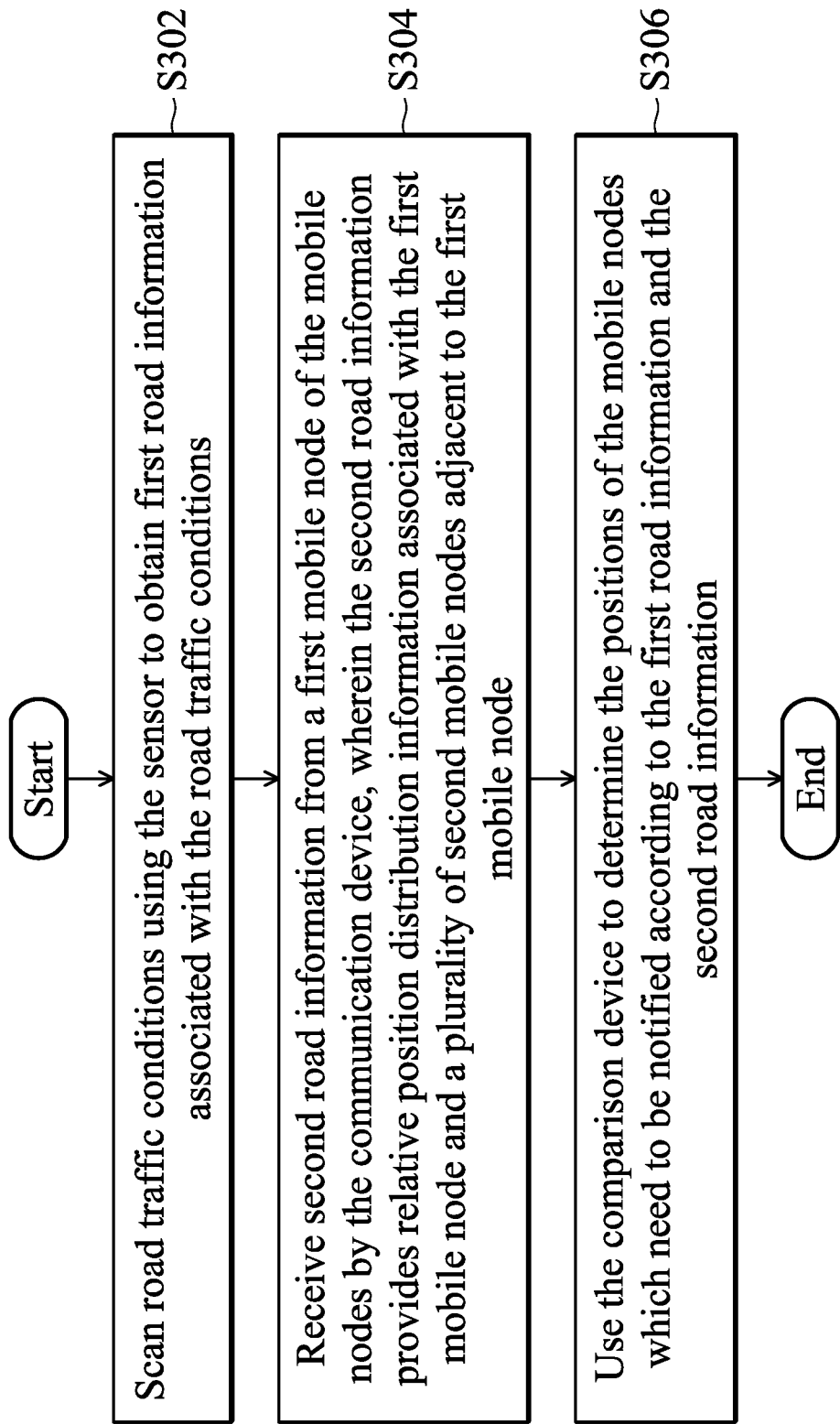
FIG. 3 is a flowchart illustrating a method for determining the position of a mobile node according to an embodiment of the present disclosure.

FIG. 3 is a flowchart illustrating a method for determining the position of a mobile node according to an embodiment of the present disclosure with reference to FIGS. 1, 2 and 3. The method for determining the position of a mobile node according to an embodiment of the present disclosure may be applied to a V2R-based communication system. For example, the method may be applied in the communication system 10 of FIG. 2 and is executed by the processor 130 of the RSU 100. In the embodiment, each of the mobile nodes 200 is a vehicle on the road, and the neighboring mobile nodes are other vehicles on the road that are adjacent to the vehicle, but the present disclosure is not limited thereto.

First, as shown in step S302, the RSU 100 scans road traffic conditions using the sensor 110 to obtain first road information associated with the road traffic conditions, wherein the first road information provides absolute position distribution information associated with the mobile nodes on the road. In the embodiment, the first road information may be a road topology that represents the road traffic conditions. In some embodiments, the first road information may be obtained from the road traffic information. Specifically, the processor 130 of the RSU 100 can obtain a position, a distance, and an angle and a distribution condition of each mobile node on the road within a scanning range according to scanning information of the sensor 110 (e.g., a radar detector). Then, the processor 130 of the RSU 100 can calculate the absolute position of each mobile node 200 according to a GPS coordinate of the positioning device 140 obtained by the positioning device 140. In the embodiment, since the RSU 100 includes the sensor 110 such as a radar detector, the RSU 100 can transmit low-power microwave beam onto the road, capture information of all target objects within the detecting range, measure the distances, speeds, and azimuth angles of the target objects to track a moving position and trajectory of each mobile node 200 for generating the sensor information.

Figure 4A:
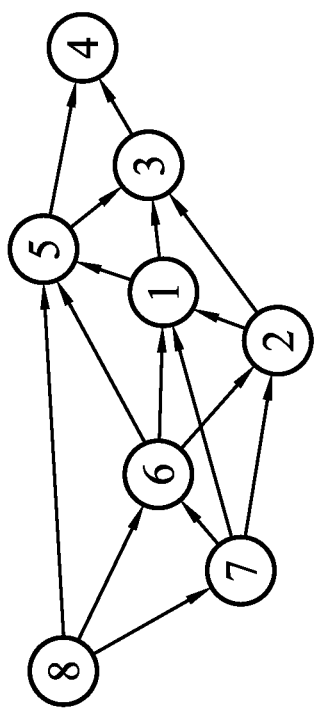
FIG. 4A is a schematic diagram illustrating a road topology according to an embodiment of the present disclosure.

Referring to FIG. 4A, FIG. 4A is a schematic diagram illustrating a road topology according to an embodiment of the present disclosure. As shown in FIG. 4A, the road topology 400 includes 8 mobile nodes, mobile nodes 1 to 8, representing the distribution state of the mobile nodes 200 within the sensing range of the RSU 100 according to the configuration in FIG. 1. However, the road topology 400 constructed by the RSU 100 merely obtains the distribution state of the vehicles on the road but not the position of each vehicle. For example, the information indicating that there are 8 cars including car A on the road can be obtained according to the road topology 400 constructed by the RSU 100, but the information cannot indicate that where car A is in the position of which one of the mobile nodes 1~8 on the road topology 400. Therefore, it is necessary to locate car A through the information provided by the vehicle of car A.

Then, in step S304, the RSU 100 receives second road information from a first mobile node of the mobile nodes 200 by the communication device 120, wherein the second road information provides relative position distribution information associated with the first mobile node and a plurality of second mobile nodes adjacent to the first mobile node. Since the absolute position provided by the GPS coordinates generally has a larger error and the relative positions of the neighboring second mobile nodes is more accurate than the absolute position provided by the GPS coordinates, the second road information including the relative position distribution information of the neighboring second mobile nodes may be more useful for determining the positions of the mobile nodes which need to be notified.

After receiving the second road information, in step S306, the RSU 100 uses the comparison device 150 to determine the positions of the mobile nodes which need to be notified according to the first road information and the second road information.

In the embodiment, the second road information may be a neighboring vehicle topology which represents the driving state of one or more second mobile nodes adjacent to the first mobile node on the road. In the following embodiments, for convenience of description, the neighboring vehicle topology is used to be an example of a star topology of the neighboring vehicle, but it can be understood that the present disclosure is not limited thereto. In other embodiments, the neighboring vehicle topology may be represented in other appropriate forms, such as a point-to-point topology or a mesh topology. The driving state includes at least the relative distance and relative angle information between the first mobile node and each of the neighboring second mobile nodes. In some embodiments, the second road information may be obtained by the first mobile node as the center according to the relative distance distribution information of a neighboring mobile node.

Specifically, each mobile node 200 (e.g., a moving vehicle) may use the sensor 210 to scan the states of the neighboring vehicles around each mobile node 200. The processor 230 of each mobile node 200 may construct a star topology centered on each mobile node 200 according to the scanned state of the neighboring vehicles, and generate the second road information. After the processor 230 generates the second road information, the second road information is broadcast to the RSU 100 by the communication device 220.

Figure 4B:
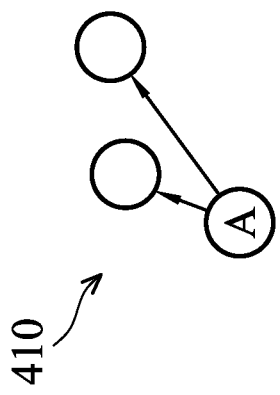
FIG. 4B is a schematic diagram illustrating a star topology of the neighboring vehicle of the first mobile node according to an embodiment of the present disclosure.

Referring to FIG. 4B, FIG. 4B is a schematic diagram illustrating a star topology of the neighboring vehicle of the first mobile node according to an embodiment of the present disclosure. As shown in FIG. 4B, it is assumed that the first mobile node represents car A, the star topology 410 of the neighboring vehicle of car A includes two mobile nodes, which are used to represent the distances, angles and other information between car A and each of the neighboring vehicles (e.g., car B and car C), as well as the attribute parameters of car A. Next, the first mobile node may generate the second road information with a specific message and format according to the distances, angles and other information between car A and each of the neighboring vehicles (e.g., car B and car C), as well as the attribute parameters of car A. In some embodiments, the second road information may comprise an identifier (ID) of the first mobile node, a time, a GPS position, a neighbor information set, and an extension, wherein the neighbor information set is generated by the first mobile node, and the extension is the information associated with the attribute of the first mobile node.

Figure 4C:
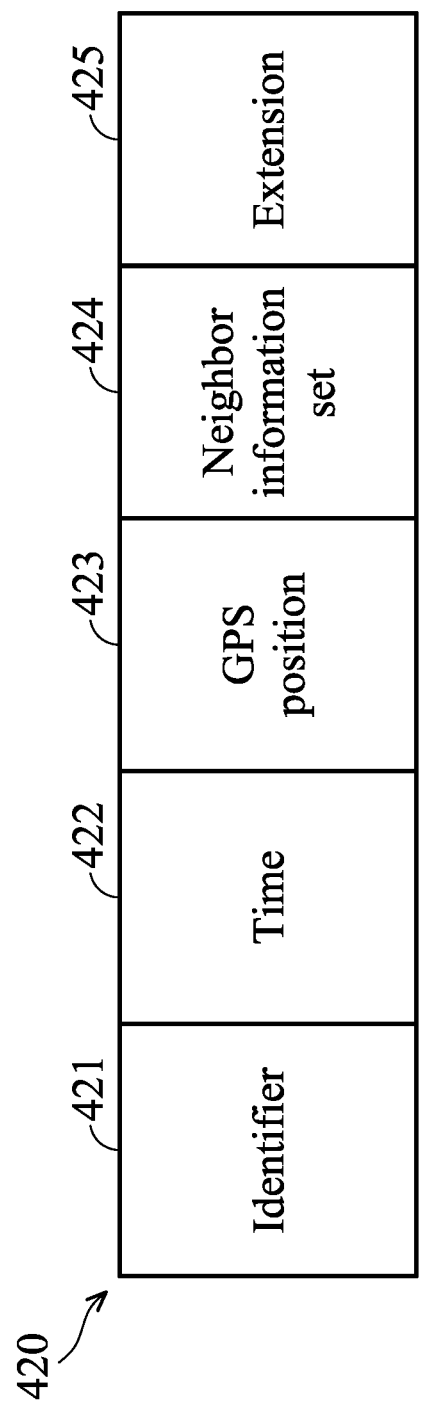
FIG. 4C is a schematic diagram illustrating the message and format of the second road information according to an embodiment of the present disclosure.

FIG. 4C is a schematic diagram illustrating the message and format of the second road information 420 according to an embodiment of the present disclosure. As shown in FIG. 4C, the message and format of the second road information 420 comprises at least an identifier 421, a time 422, a GPS position 423, a neighbor information set 424, and an extension 425, wherein the identifier 421 includes an unique code corresponding to each of the mobile nodes, the time 422 indicates the time of transmitting the second road information 420, and the GPS position 423 comprises the GPS coordinate of each mobile node. The neighbor information set 424 comprises a mobile node identifier (ID) of each neighboring mobile node, relative distances (dis) and angles (ang) between the neighboring mobile nodes. The extension 425 comprises the driving state of each mobile node, such as a velocity (vel), type, and heading direction. Then, the processor 130 of the RSU 100 can use the comparison device 150 to perform positioning of the first mobile node (e.g., car A) according to the distances and angles between each mobile node u and each neighboring mobile node as well as the attribute parameters of u through the topology information comparison algorithm of the present disclosure to find a position that corresponds to the first mobile node on the road topology.

In an embodiment, the second road information further provides GPS position information that corresponds to the first mobile node. The step of determining the position of the first mobile node according to the first road information and the second road information using the comparison device further comprises: extracting a portion of the first road information according to the position information of the first mobile node to obtain third road information centered on a third mobile node, and checking whether the third road information centered on the third mobile node is the same as the second road information centered on the first mobile node to determine whether the third mobile node is the first mobile node, wherein the third mobile node is the second mobile node which is the closest mobile node to the first mobile node and the third road information is a to-be-mapped topology. In the step of comparing the third road information and the second road information, when changes in distance, angle, and distance in a past time are closer (it means that the second road information is the same as the third road information), it is determined that the position of the third mobile node is the same as the position of the first mobile node.

The step of determining the position of the first mobile node according to the first road information and the second road information using the comparison device may further comprise: taking fourth road information centered on a fourth mobile node that is closest to the first mobile node from the first road information as the road information to be compared when the third road information and the second road information are not the same, checking whether mobile node information corresponding to the second road information and mobile node information corresponding to the fourth road information are the same, and taking fifth road information centered on a fifth mobile node that is the second-closest to the first mobile node as the next road information to be compared when the mobile node information corresponding to the second road information and the mobile node information corresponding to the fourth road information are not the same. In the step of comparing the mobile node information corresponding to the second road information and the mobile node information corresponding to the fifth road information, when changes in distance, angle, and distance in a past time are closer, it is determined that the position of the fifth mobile node is the same as the position of the first mobile node.

In some embodiments, the mobile node information corresponding to the fifth road information and the mobile node information corresponding to the second road information are compared to generate a first comparison result. When the fifth mobile node and the sixth mobile node are included in the mobile nodes whose changes in distance, angle, and distance in the past time are closer in the first comparison result, the extension information of the fifth mobile node and the extension information of the sixth mobile node are compared to generate a second comparison result. The position of the first mobile node is determined by the most suitable one between the fifth mobile node and the sixth mobile node according to the second comparison result. The detailed comparison algorithm will be described later.

Some embodiments shown as follows illustrate the topology information comparison algorithm of the present disclosure by drawings and are used to explain actual application details of the method for determining the position of a mobile node according to the present disclosure, but the disclosure is not limited thereto.

Figure 5A:
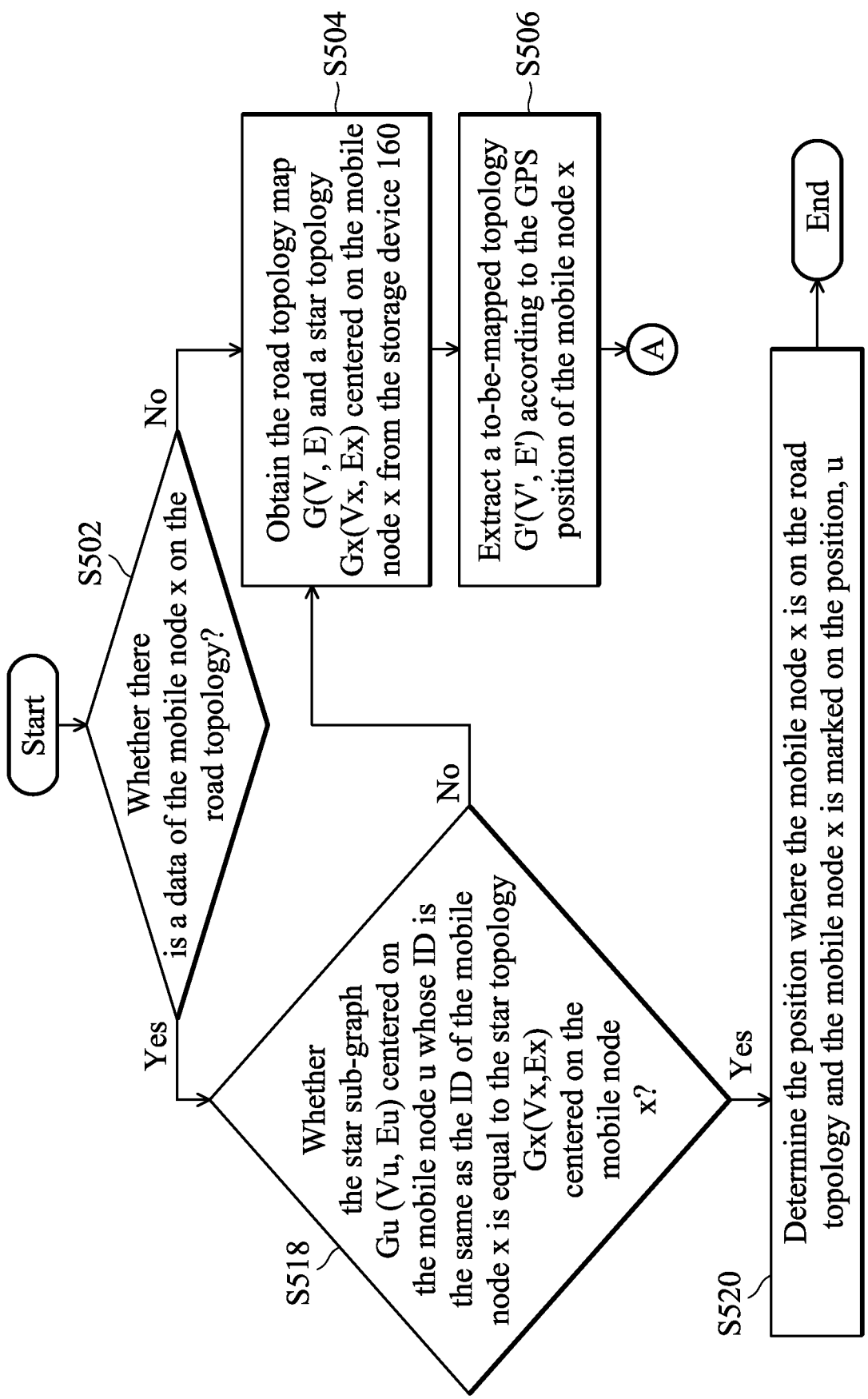
FIG. 5A and FIG. 5B are flowcharts illustrating the topology information comparison algorithm according to an embodiment of the present disclosure.
Figure 5B:
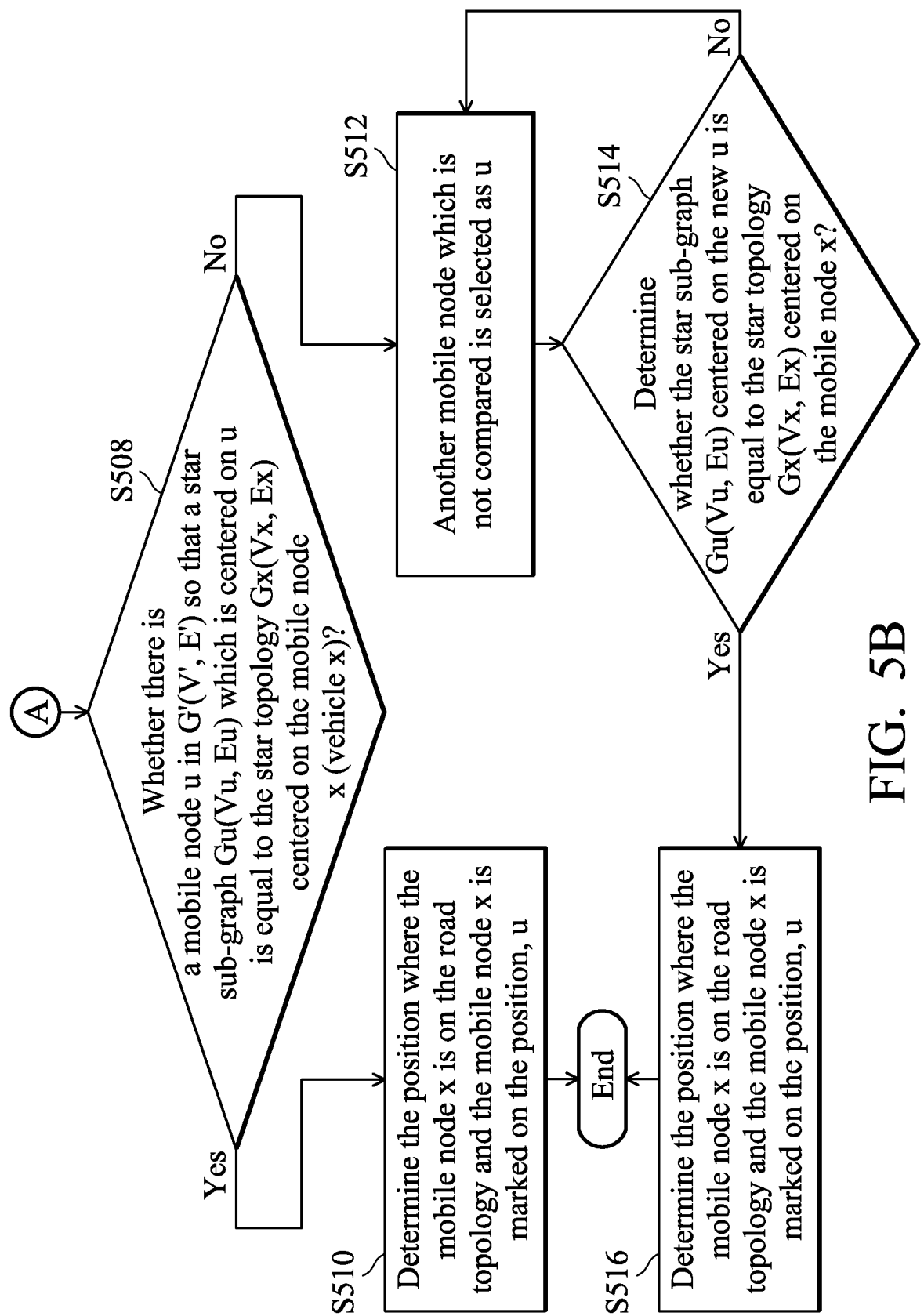

FIG. 5A and FIG. 5B are flowcharts illustrating the topology information comparison algorithm according to an embodiment of the present disclosure. FIG. 6A to FIG. 6E are schematic diagrams illustrating the results of the comparison process according to an embodiment of the present disclosure. Please refer to FIG. 1, FIG. 2, FIG. 4A, FIG. 4B, FIG. 5A, FIG. 5B, and FIGS. 6A to 6E. The topology information comparison algorithm according to an embodiment of the present disclosure may be applied to a device. For example, the topology information comparison algorithm may be applied to the RSU 100 of the FIG. 2 and executed by the processor 130 via the comparison device 150. In the embodiment, it is assumed that the first road information is the road topology 400 shown in FIG. 4A, and the second road information is the star topology 410 of the neighboring vehicle shown in FIG. 4B.

When the RSU 100 wants to determine the position of a mobile node x, the RSU 100 first determines whether there is a data of the mobile node x on the road topology 400 (step S502). In the embodiment, when a mobile node on the road topology 400 has been compared, the processor 130 may mark an ID of the mobile node on a corresponding position to identify the mobile node and record the position of the mobile node. Therefore, the RSU 100 may first determine whether there is a data of the mobile node x on the road topology 400 to reduce the number of comparisons.

Figure 6A:
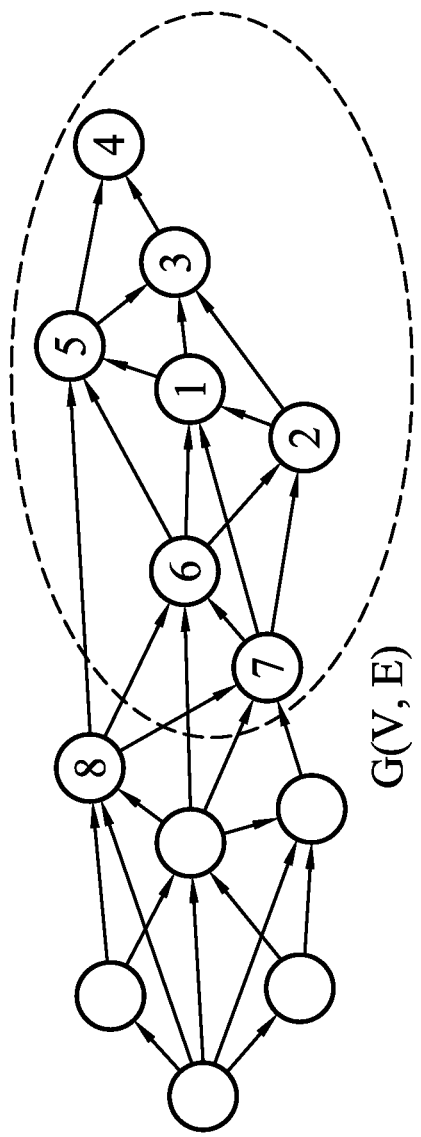
FIG. 6A to FIG. 6E are schematic diagrams illustrating the results of the comparison process according to an embodiment of the present disclosure.
Figure 6B:
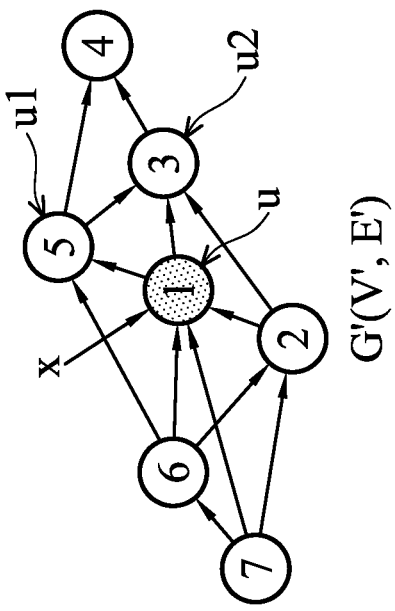

When there is no data of the mobile node x (No in step S502), it indicates that the mobile node x has not been compared, the RSU 100 obtains the road topology map G(V, E) (for example, as shown in 400 of FIG. 4A) and a star topology Gx(Vx, Ex) centered on the mobile node x (vehicle x) (for example, as shown in 410 of FIG. 4B) from the storage device 160 (step S504) and extracts a to-be-mapped topology G'(V', E') (the dashed line in FIG. 6A) according to the GPS position of the mobile node x (step S506). Specifically, the processor 130 may retrieve a to-be-mapped topology G' (V', E') (as shown in FIG. 6B.) by using the GPS position of the mobile node x and a possible error distance (e.g., 15 meters in radius) of the GPS to reduce the number of mapping comparison. That is, the to-be-mapped topology G'(V', E') only comprises a part of the road topology G(V, E). Therefore, every time that a comparison is performed, only part of the road topology needs to be compared, and there is no need to compare the entire road topology. Thus, the number of mapping comparisons may be effectively reduced.

Figure 6C:
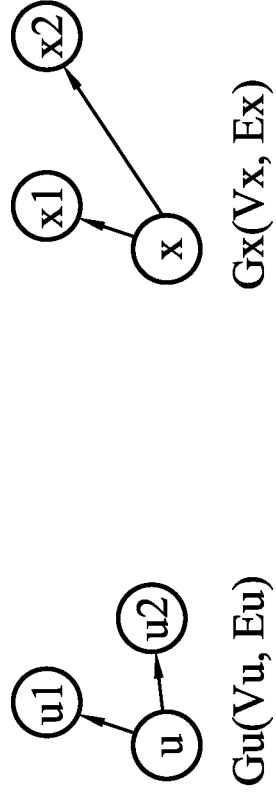

After the to-be-mapped topology G'(V', E') is determined, the RSU 100 then determines whether there is a mobile node u in G'(V', E') so that a star sub-graph Gu(Vu, Eu) which is centered on u is equal to the star topology Gx(Vx, Ex) centered on the mobile node x (vehicle x) (as shown in FIG. 6C) (step S508). In this step, the RSU 100 may sequentially select a third mobile node which is closest to the position of the mobile node x from the G'(V', E') to perform the comparison. For example, it is assumed that the mobile node 1 of the G'(V', E') is closest to x. The mobile node 1 is taken as the third mobile node u and Gu(Vu, Eu) is the star topology corresponding to u. Then, u and x are compared to each of the neighboring points. In the embodiment, it is assumed that the mobile node u has two neighboring points u1 and u2, and the mobile node x has two neighboring points x1 and x2. The comparison of the neighboring points is to compare whether the correlation distance and angle between u and u1 and between u and u2 is equal to the correlation distance and angle between x and x1 and between x and x2.

In an embodiment, the comparison of each neighboring point includes the step of determining whether the following formula holds:

$|dis(u1)-dis(x1)| \leq \Delta d1;$ $|ang(u1)-ang(x1)| \leq \Delta \theta 1;$ $|dis(u2)-dis(x2)| \leq \Delta d2;$ and $|ang(u2)-ang(x2)| \leq \Delta \theta 2,$ wherein dis(u1) represents the relative distance between u and u1, ang(u1) represents the relative angle between u and u1, dis(u2) represents the relative distance between u and u2, ang(u2) represents the relative angle between u and u2, dis(x1) represents the relative distance between x and x1, ang(x1) represents the relative angle between x and x1, dis(x2) represents the relative distance between x and x2, ang(x2) represents the relative angle between x and x2, and parameters $\Delta d1$, $\Delta \theta 1$, $\Delta d2$ and $\Delta \theta 2$ represent ranges of error, which depends on degrees of sensing accuracy of the RSU 100. The parameters $\Delta d1$, $\Delta \theta 1$, $\Delta d2$ and $\Delta \theta 2$ can be adjusted according to different degrees of sensing accuracy.

Figure 6D:
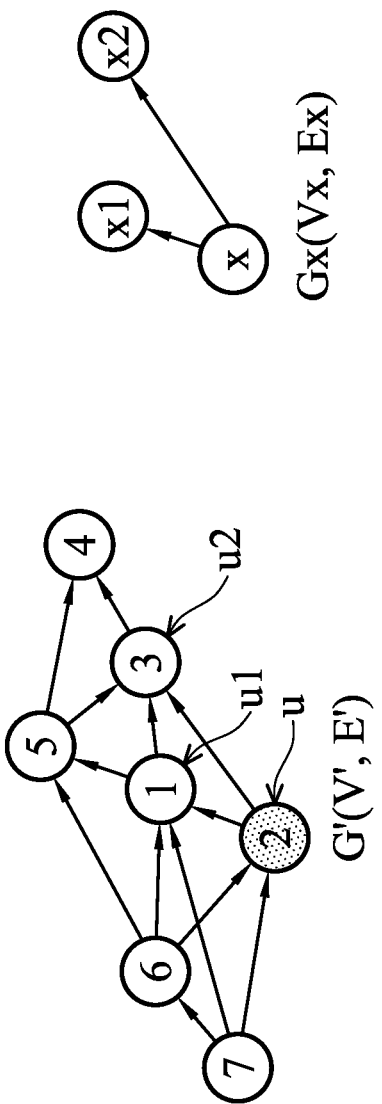
Figure 6E:
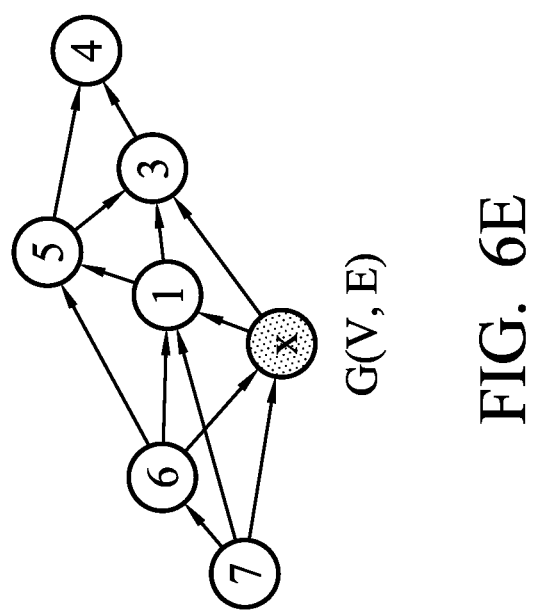

It is assumed that when both u1 and x1 are met ($\leq \Delta d1$ and $\leq \Delta \theta 1$) and both u2 and x2 are met ($\leq \Delta d2$ and $\leq \Delta \theta 2$) during the comparison process, it means that the changes in distance, angle and distance in the past time between u and each neighboring point of u are consistent with the changes in distance, angle and distance in the past time between x and each neighboring point of x (i.e., Gu=Gx) (Yes in step S508), and the mobile node x falls in the position, u, of G'(V', E'), the position of x may be located to determine the position where the mobile node x is on the road topology and the mobile node x is marked on the position, u (as shown in FIG. 6E) (step S510). The comparison is completed and the process ends.

It is assumed that when both u1 and x1 are met ($\leq \Delta d1$ and $\leq \Delta \theta 1$) but $|dis(u2)-dis(x2)| > \Delta d2$ during the comparison process, it means that the distance, angle and distance in the past time between u and each neighboring point of u are not consistent with the distance, angle and distance in the past time between x and each neighboring point of x (i.e., Gu≠Gx) (Yes in step S508), the comparison fails (No in step S508). Therefore, another mobile node which is not compared (for example, a mobile node which is the second-closest to the mobile node x) is selected as u (step S512) and subsequent comparison is performed. Next, it is determined whether the star sub-graph Gu(Vu, Eu) centered on the new u is equal to the star topology Gx(Vx, Ex) centered on the mobile node x (vehicle x) (step S514). As shown in FIG. 6D, it is assumed that the mobile node 2 is the mobile node which is the second-closest to the mobile node x on G'(V', E'). The mobile node 2 is treated as u and Gu(Vu, Eu) is treated as the star topology corresponding to the mobile node 2. Next, a comparison that is similar to the comparison of u, x and each neighboring point of u and x is performed. In the embodiment, when the changes in distance, angle and distance in the past time between u and each neighboring point of u are consistent with the changes in distance, angle and distance in the past time between x and each neighboring point of x are met (Yes in step S514), it means that the mobile node x falls on the position, u, of G' (V', E'), the position of x can be located to determine the position where the mobile node x is on the road topology and the mobile node x is marked on the position, u (step S516). The comparison is completed and the process ends. Similarly, when the distance and angle between u and each neighboring point are consistent with the distance and angle of u and between x and each neighboring point of x during the comparison process, the comparison fails (No at step S514) and the process returns to step S512. Another mobile node which is not compared (for example, a mobile node which is the third-closest to the mobile node x) is selected as u and subsequent comparison is performed. Next, it is determined whether the new u is the mobile node x according to the determination result of determining whether the star sub-graph Gu(Vu, Eu) centered on the new u is equal to the star topology Gx(Vx, Ex) centered on the mobile node x (vehicle x) until the u matched to the mobile node x is found or all the mobile nodes are not matched to the mobile node x.

In some embodiments, in the comparison process, when there are two mobile nodes u and v so that Gu=Gv=Gx (that is, the changes in distance, angle and distance in the past time between u and each neighboring point of u are consistent with the changes in distance, angle and distance in the past time between x and each neighboring point of x, and the changes in distance, angle, and distance in the past time between v and each neighboring point of v are consistent with the changes in distance, angle and distance in the past time between x and each neighboring point of x), the RSU 100 may further compare the information in the extension, such as the velocity, type, and heading direction of each mobile node, to find a mobile node which is most matched to x from the mobile nodes u and v as x. For example, it is assumed that the mobile node v are found to be most matched to x according to the information of the heading direction in the extension, it means that the mobile node x falls in the position, v, of G' (V', E'), the position of x can be located to determine the position where the mobile node x is on the road topology and the mobile node x is marked on the position, v.

Referring to FIG. 5A and FIG. 5B, when the road topology already has data of the mobile node x (Yes in step S502), the RSU 100 directly selects the mobile node whose ID is the same as the ID of the mobile node x in G(V,E) and performs the comparison of determining whether the star sub-graph Gu (Vu, Eu) centered on the mobile node u whose ID is the same as the ID of the mobile node x is equal to the star topology Gx(Vx,Ex) centered on the mobile node x (vehicle x) (step S518).

Similarly, when the comparison result indicates that the changes in distance, angle and distance in the past time between u and each neighboring point of u are consistent with the changes in distance, angle and distance in the past time between x and each neighboring point of x (i.e., Gu=Gx) (Yes in step S514), it means that the mobile node x falls on the position, u, of G' (V', E'), the position of x can be located to determine the position where the mobile node x is on the road topology and the mobile node x is marked on the position, u (step S520). The comparison is completed and the process ends. On the contrary, when the comparison result indicates that the distance, angle and distance in the past time between u and each neighboring point of u is not consistent with the distance, angle and distance in the past time between x and each neighboring point of x (i.e., Gu≠Gx), the comparison fails and the process returns to step S504 for performing the comparison when there is no mobile node x on the road topology 400.

It should be understood that, in the embodiment, the step of determining the position of the mobile node x on the road topology and marking the mobile node x on the position, u, is divided into steps S510, S516 and S520 for convenience of description. All the three operations performed in the three steps are the same. Therefore, in another embodiment, the three steps may also be integrated into a single step.

After the corresponding position of each mobile node on the road topology is found according to the comparison algorithm, the RSU 100 may warn specific vehicles. In an embodiment, the RSU 100 can transmit an alert notification to specific mobile nodes or exchange data with the specific mobile nodes after determining the position of each mobile node. Since the RSU 100 can obtain the information identifying each vehicle and the position of each vehicle, the RSU 100 can merely transmit a warning message to a specific vehicle, such as a vehicle in a dangerous state, so as to avoid driving interference caused by information transmitted to other vehicles which do not need to receive the warning message. In addition, when the mobile nodes include an autopilot vehicle, the RSU 100 may also accurately locate the position of the autopilot vehicle, assist the autopilot vehicle in real time, and further assist the autopilot vehicle in safe driving according to the road conditions.

In some embodiments, the RSU 100 and the mobile nodes 200 may perform a positioning-signal (e.g., a GPS signal) time-synchronization operation to synchronize the time of receiving/transmitting the signal by the RSU 100 with the times of receiving/transmitting the signal by the mobile nodes, so as to avoid misjudgment due to a transmission delay. In other embodiments, the first road information and the second road information comprise first time information and second time information, respectively. The comparison device 150 of the RSU 100 may receive a plurality of second road information, and takes the second road information having the second time information which is the same as the first time information to compare to the first road information. When the first time information in the first road information is not the same as the second time information in all the second road information, the RSU 100 takes one of the second road information having the second time information which is closest to the first time information from the second road information or takes two of the second road information having at least two second time information which is close to the first time information from the two second road information to perform an interpolation and compares the interpolated road information with the first road information to determine the position of the mobile node 200 on the road. For example, when the first time information is 9 o'clock, the comparing device 150 may first check whether there is second time information which is 9 o'clock in the second road information received from the mobile node 200. If yes, the RSU 100 directly compares the second road information to with the first road information. When there is no second time information which is 9 o'clock in the received second road information but there are two second time information which are 9:01 and 8:55 in two second road information, the comparison device 150 can take the second road information which has the second time information, 9:01, to compare to the first road information, or the comparison device 150 can also take the two road information which have the two time information, 9:01 and 8:55, respectively, to perform an interpolation and generate the interpolated road information, and then compares the interpolated road information to the first road information to determine the position of the mobile node 200 on the road (i.e., the position that corresponds to the node in the first road information).

In an embodiment, the notification or the warning message transmitted by the RSU 100 may comprise a field, which may include an ID of the mobile node 200 which needs to be notified or warned. Thus, when each mobile node 200 receives the notification or the warning message from the RSU 100, each mobile node 200 can determine whether the notification or the warning message is sent to itself according to the ID in the field. If not, the mobile node 200 ignores the message, and if yes, the mobile node 200 perform the corresponding actions such as displaying a warning message or a warning signal to inform the driver or performing automatic collision avoidance, etc.

In some embodiments, the comparison algorithm for determining the position of the mobile node may also be implemented on the mobile node side. In the embodiment, each mobile node may include a comparison device similar to the comparison device 150, used to perform its own positioning according to its own star topology of the neighboring vehicle and the road topology generated by the RSU 100.

Figure 7:
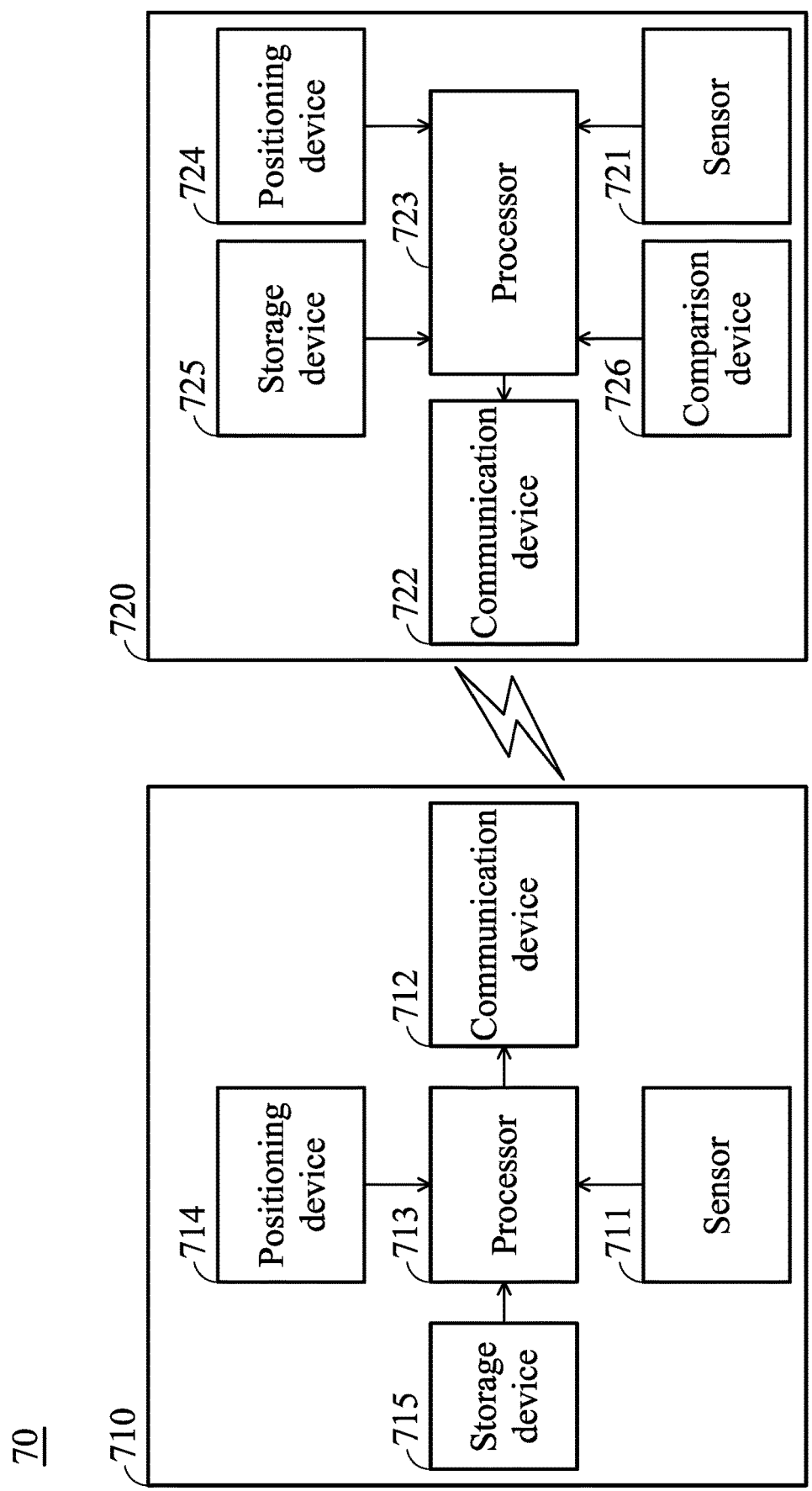
FIG. 7 shows a schematic diagram of system architecture of a communication system according to another embodiment of the present disclosure.

FIG. 2 shows a schematic diagram of system architecture of a communication system 70 according to an embodiment of the present disclosure. As shown in FIG. 7, the communication system 70 includes a RSU 710 and one or more mobile nodes 720, wherein the RSU 710 includes at least a sensor 711, a communication device 712, a processor 713, a positioning device 714 and a storage device 715. The mobile node 720 includes at least a sensor 721, a communication device 722, a processor 723, a positioning device 724, a storage device 725 and a comparison device 726.

The sensor 711 (e.g., radar) periodically senses one or more mobile nodes 720 (e.g., vehicles, pedestrians, etc.) on a road to generate sensor information. The communication device 712 is connected to the processor 713 and bi-directionally links with communication devices having the same communication channel and protocol so as to receive external messages such as messages sent by each mobile node 720 and then output received messages to the processor 713, and broadcasts the message (such as the first road information representing the road topology and notifications or warning messages) output by the processor 713 to the outside. The processor 713, which is coupled to the sensor 711, the communication device 712, the positioning device 714, and the storage device 715, may be used to load and execute a series of instructions and/or program codes from the storage device 715 to control the operations of the sensor 711, the communication device 712, the positioning device 714 and the storage device 715 to perform the method for determining the position of the mobile node in the present disclosure, the details of which will be described more in the following paragraphs.

The positioning device 714 can be used to obtain position coordinate information of the current location of the RSU 710. The storage device 715 may also store instruction sets and/or program code modules that can be executed by the processor 713. The storage device 715 may further store various items of data required for the operation, such as the sensor information, the first road information which represents a road topology, and so on.

The sensor 721 (e.g., a radar) periodically senses the driving conditions of one or more neighboring mobile nodes 720 within one or more sensing ranges, and generates sensor information associated with one or more mobile nodes 720 around the sensor 721. The communication device 722 is connected to the processor 723 and bi-directionally links with communication devices having the same communication channel and protocol so as to receive external messages such as messages sent by each mobile node 720 and then output received messages to the processor 723, and broadcasts the message (such as the messages transmitted by other mobile node 720 or the notifications and warning messages broadcast by the RSU 710) output by the processor 730. The positioning device 724 can be used to obtain position coordinate information of the current location of the mobile node.

The storage device 725 may also store instruction sets and/or program code modules that can be executed by the processor 723. The storage device 725 may further store various items of data required for the operation, such as the sensor information, the first road information which represents a road topology and received from the RSU 710, the second road information which represents the star topology of the neighboring vehicle, and so on. The processor 723, which is coupled to the sensor 721, the communication device 722, the positioning device 724, the storage device 725 and the comparison device 726, may be used to load and execute a series of instructions and/or program codes from the storage device 725 to control the operations of the sensor 721, the communication device 722, the positioning device 724, the storage device 725 and the comparison device 726 to perform the method for determining the position of the mobile node in the present disclosure. In the embodiment, the first road information may represent a road topology, and the second road information may represent a star topology of the neighboring vehicle.

Specifically, the RSU 710 obtains the sensor-scanning data from the sensor 711, constructs the first road information (i.e., the road topology) according to the sensor-scanning data using the processor 713, and broadcasts the first road information to each mobile node 720 by the communication device 712. The mobile node 720 receives the first road information broadcast by the RSU 710 by the communication device 722, obtains the sensor-scanning data from the sensor 721, constructs the second road information according to the sensor-scanning data (i.e., the star topology of the neighboring vehicle) using the processor 723, and compares the road topology to the star topology of the neighboring vehicle to generate the topology position of the mobile node 720, and determines whether the mobile node 720 itself is the target vehicle for which the notification or the warning message is intended, according to the notification or the warning message transmitted by the RSU 710. The details will be described in the following paragraphs.

Referring to FIG. 2 and FIG. 7, the functions and architecture of the sensor 711, the communication device 712, the processor 713, the positioning device 714 and the storage device 715 of the RSU 710 in FIG. 7 are similar to those of the sensor 110, the communication device 120, the processor 130, the positioning device 140 and the storage device 150 of the RSU 100 in FIG. 2. The functions and architecture of the sensor 721, the communication device 722, the processor 723, the positioning device 724 and the storage device 725 of the mobile node 720 in FIG. 7 are similar to those of the sensor 210, the communication device 220, the processor 230, the positioning device 240 and the storage device 250 of the mobile node 200 in FIG. 2. Therefore, the details related to the functions of the components may refer to the description of FIG. 2 and will be omitted. The only difference between FIG. 7 and FIG. 2 is that the mobile node 720 of FIG. 7 has the comparison device 726 used to perform the comparison algorithm of FIG. 5A and FIG. 5B, and similar to the comparison device 150 in the RSU 100 shown in FIG. 2, which can locate its own topology position according to the road topology and the star topology of the neighboring vehicle. The details will be described in the following paragraphs.

Figure 8:
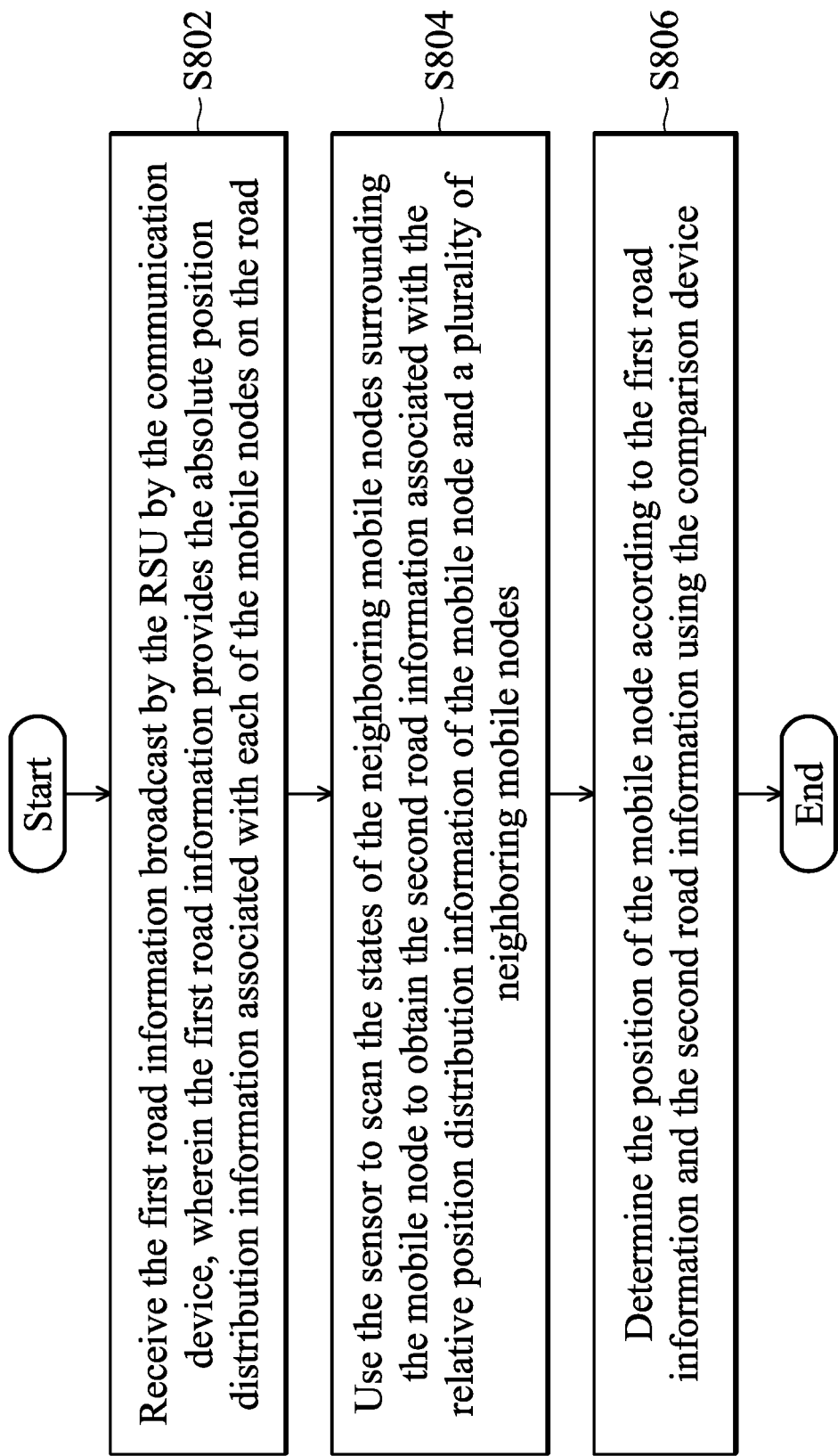
FIG. 8 is a flowchart illustrating a method for determining the position of a mobile node according to another embodiment of the present disclosure.

FIG. 8 is a flowchart illustrating a method for determining the position of a mobile node according to another embodiment of the present disclosure with reference to FIG. 1, FIG. 7, and FIG. 8. The method for determining the position of the mobile node according to the present disclosure may be applied to a V2R-based communication system. For example, the method may be applied in the communication system 70 of FIG. 7 and is executed by the processor 723 of the mobile node 720. In the embodiment, each of the mobile nodes 720 is a vehicle on the road, and the neighboring mobile nodes are other vehicles on the road that are adjacent to the vehicle, but the present disclosure is not limited thereto.

First, in step S802, the mobile node 720 receives the first road information broadcast by the RSU 710 by the communication device 722, wherein the first road information provides the absolute position distribution information associated with each of the mobile nodes on the road. In the embodiment, the first road information may be a road topology (as shown in FIG. 4A) which represents the road traffic conditions. In some embodiments, the first road information may be obtained from the road traffic information. In some embodiments, the first road information may include an ID, a time, a GPS position, a road node information set, and an extension of the RSU 710, wherein the ID includes a unique code corresponding to the RSU 710, the time represents the transmission time of the first road information, the GPS position includes the GPS coordinate of the RSU 710, and the road node information set includes the distribution state information of all the mobile nodes 720 within the sensing range of the RSU 710 and can be used to construct a road topology representing the road traffic state. In detail, since the road topology which only has the distance and the position is broadcast by the RSU 710, the vehicle (the mobile node 720) needs to compare the topologies or track the neighboring vehicles multiple times to determine the position even if the vehicle obtains the state of the neighboring vehicle using a sensor. Therefore, in the embodiment, the extension is provided by the RSU 710. The extension is used to describe additional information of each vehicle in the topology so that the vehicle may enhance processing speed after receiving the information, wherein the extension includes the velocity information, type information, and information of heading direction corresponding to each mobile node.

Next, in step S804, the mobile node 720 uses the sensor 721 to scan the states of the neighboring mobile nodes surrounding the mobile node 720 to obtain the second road information associated with the relative position distribution information of the mobile node 720 and a plurality of neighboring mobile nodes. In the embodiment, the second road information may be a star topology of the neighboring vehicle that represents the driving state of one or more mobile nodes on the road that are adjacent to the mobile node 720 (as shown in FIG. 4B). The driving state includes at least the relative distance and relative angle information between the mobile node 720 and each of the neighboring mobile nodes. In some embodiments, the second road information may be obtained by the mobile node 720 as the center according to the relative distance distribution information of a neighboring mobile node. Specifically, the mobile node 720 may use the sensor 721 to scan the states of the neighboring vehicles around each mobile node 720. The processor 723 of each mobile node 720 may construct a star topology centered on the mobile node 720 according to the scanned state of the neighboring vehicles, and generate the second road information.

After the second road information is generated, in step S806, the mobile node 720 determines the position of the mobile node 720 according to the first road information and the second road information using the comparison device 726.

In an embodiment, the mobile node 720 is the first mobile node, and the neighboring mobile node of the mobile node 720 is the second mobile node, wherein the second road information further provides GPS position information corresponding to the first mobile node. The step of determining the position of the mobile node according to the first road information and the second road information using the comparison device may further include: extracting a portion of the first road information according to the position information of the first mobile node to obtain the third road information centered on the third mobile node; and checking whether the third road information centered on the third mobile node is the same as the second road information centered on the first mobile node to determine whether the third mobile node is the first mobile, wherein the third mobile node is the second mobile node which is closest to the first mobile node, and the third road information is a to-be-mapped topology map. In the step of comparing the mobile node information of the second road information to the mobile node information of the third road information, when the changes in distance, angle and distance in the past time of the third mobile node are closer to the changes in distance, angle and distance in a past time of the first mobile node, it means that the second road information is the same as the third road information, the mobile node 720 determines that the position of the third mobile node is the same as the position of the first mobile node.

The step of determining the position of the first mobile node according to the first road information and the second road information using the comparison device may further include: taking the fourth road information centered on the fourth mobile node that is closest to the first mobile node from the first road information as the road information to be compared when the third road information and the second road information are not the same, checking whether mobile node information corresponding to the second road information and mobile node information corresponding to the fourth road information are the same, and taking the fifth road information centered on the fifth mobile node that is the second-closest to the first mobile node as the next road information to be compared when the mobile node information corresponding to the second road information and the mobile node information corresponding to the fourth road information are not the same. In the step of comparing the mobile node information corresponding to the second road information and the mobile node information corresponding to the fifth road information, when changes in distance, angle and distance in a past time of the fifth mobile node are closer to the changes in distance, angle and distance in the past time of the first mobile node, it is determined that the position of the fifth mobile node is the same as the position of the first mobile node.

In some embodiments, the mobile node information corresponding to the fifth road information and the mobile node information corresponding to the second road information are compared to generate a first comparison result. When there are a fifth mobile node and a sixth mobile node whose changes in distance, angle and distance in the past time are closer to the changes in distance, angle and distance in the past time of the first mobile node in the first comparison result, the extension information of the fifth mobile node and the extension information of the sixth mobile node are compared to generate a second comparison result. The position of the first mobile node is determined by the most suitable one between the fifth mobile node and the sixth mobile node according to the second comparison result. The detailed comparison algorithm will be described later.

In detail, the processor 723 of the mobile node 720 may use the comparison algorithm shown in FIG. 5A and FIG. 5B to find the position of the mobile node 720 on the road topology according to the road topology broadcast by the RSU 710 and the star topology of the neighboring vehicle of the mobile node 720 using the comparison device 726. The illustrations of FIG. 5A and FIG. 5B are described above, so the details will not be repeated.

Therefore, the communication system and the method for determining the position of a mobile node thereof according to an embodiment of the present disclosure can be applied to a traffic security system based on V2R communication, and may achieve the purpose of informing a specific vehicle through the sensor information exchange between mobile nodes such as a vehicle and a RSU. The position of a vehicle which needs to be notified can be determined by using the topology information of the neighboring vehicle generated by vehicles and the road topology information generated by the RSU through a comparison of topology information, so that the RSU may transmit warning messages or notifications to specific drivers. In addition to warning the specific vehicles, the communication system and the method may avoid driving interference caused by information transmitted to other vehicles which do not need to receive the warning message other vehicles. In addition, the communication system and the method may assist the autopilot vehicle in real time to avoid potential collisions. The communication system and the method enhance the development of self-driving vehicles and further assist driving safety.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it should be understood that the application is not limited thereto. Those who are skilled in this technology can still make various alterations and modifications without departing from the scope and spirit of this application. For example, the systems and methods described in the embodiments of the present application may be implemented in physical embodiments of hardware, software, or a combination of hardware and software. Therefore, the scope of the present application shall be defined and protected by the following claims and their equivalents.

What is claimed is:

1. A method for determining the position of a mobile node, applied to a roadside unit (RSU), wherein the RSU and a plurality of mobile nodes form a communication network on a road, the method comprises:
   obtaining, by at least one sensor, first road information, wherein the first road information provides absolute position distribution information associated with the mobile nodes;
   receiving, by a communication device, second road information from a first mobile node of the mobile nodes, wherein the second road information provides relative position distribution information associated with the first mobile node and second mobile nodes adjacent to the first mobile node; and
   determining, by a comparison device, a position of the first mobile node on the road according to the first road information and the second road information,
   wherein the second road information further provides position information corresponding to the first mobile node and the step of determining the position of the first mobile node on the road according to the first road information and the second road information using the comparison device comprises:
   extracting a portion of the first road information according to the position information of the first mobile node to obtain third road information, wherein the third road information centered on a third mobile node; and
   checking whether the third road information centered on the third mobile node is the same as the second road information centered on the first mobile node, and if yes, determining that the position of the third mobile node is the same as the position of the first mobile node.

2. The method for determining the position of a mobile node as claimed in claim 1, wherein the first road information is obtained from road traffic information.

3. The method for determining the position of a mobile node as claimed in claim 1, wherein the second road information includes an identifier of the first mobile node, a time, a GPS position, a neighbor information set, and an extension.

4. The method for determining the position of a mobile node as claimed in claim 3, wherein the neighbor information set includes a mobile node identifier, distance information, and angle information for each of the second mobile nodes corresponding to the first mobile node.

5. The method for determining the position of a mobile node as claimed in claim 3, wherein the extension includes speed information, type information, and travel direction information corresponding to the first mobile node.

6. The method for determining the position of a mobile node as claimed in claim 1, wherein the third mobile node is the closest mobile node to the first mobile node.

7. The method for determining the position of a mobile node as claimed in claim 1, wherein the step of determining the position of the first mobile node on the road according to the first road information and the second road information using a comparison device comprises:
   taking fourth road information centered on a fourth mobile node that is closest to the first mobile node from the first road information as the road information to be compared when the third road information and the second road information are not the same, checking whether mobile node information corresponding to the second road information and mobile node information corresponding to the fourth road information are the same, and taking fifth road information centered on a fifth mobile node that is the second-closest to the first mobile node as the next road information to be compared when the mobile node information corresponding to the second road information and the mobile node information corresponding to the fourth road information are not the same.

8. The method for determining the position of a mobile node as claimed in claim 7, further comprising:
   comparing mobile node information corresponding to the fifth road information and the mobile node information corresponding to the second road information; and
   determining that a position of the fifth mobile node is the same as the position of the first mobile node when changes in distance, angle and distance in a past time of the fifth mobile node are closer to changes in distance, angle and distance in a past time of the first mobile node.

9. The method for determining the position of a mobile node as claimed in claim 8, wherein whether the changes in distance, angle and distance in the past time of the fifth mobile node are closer to the changes in distance, angle and distance in the past time of the first mobile node is determined according to parameters of sensing accuracy of the sensor.

10. The method for determining the position of a mobile node as claimed in claim 7, further comprising:
comparing mobile node information corresponding to the fifth road information and the mobile node information corresponding to the second road information to generate a first comparison result;
comparing extension information of the fifth mobile node and extension information of a sixth mobile node to generate a second comparison result when there are a fifth mobile node and a sixth mobile node whose changes in distance, angle and distance in the past time are closer to the changes in distance, angle and distance in the past time of the first mobile node in the first comparison result; and
determining the position of the first mobile node according to the second comparison result.

11. The method for determining the position of a mobile node as claimed in claim 1, further comprising:
sending, by the communication device, an alert notification to the first mobile node or exchanging data with the first mobile node after determining the position of the first mobile node.

12. The method for determining the position of a mobile node as claimed in claim 1, further comprising:
performing a positioning-signal time-synchronization operation to synchronize the time of the RSU with the time of the first mobile node before receiving the second road information from the first mobile node.

13. The method for determining the position of a mobile node as claimed in claim 1, further comprising:
obtaining an identifier of the first mobile node.

14. The method for determining the position of a mobile node as claimed in claim 1, wherein the second road information is obtained by the first mobile node as the center according to the relative distance distribution information of a neighboring mobile node.

15. A method for determining the position of a mobile node, applied to the mobile node, wherein the mobile node and a roadside unit (RSU) form a communication network on a road, the method comprising:
receiving, by a communication device, first road information from the RSU, wherein the first road information provides absolute position distribution information associated with the mobile node and a plurality of neighboring mobile nodes;
obtaining, by at least one sensor, second road information, wherein the second road information provides relative position distribution information associated with the mobile node and the neighboring mobile nodes; and
determining, by a comparison device, the position of the mobile node on the road according to the first road information and the second road information,
wherein the mobile node is a first mobile node and each of the neighboring mobile nodes is a second mobile node, the second road information further provides position information corresponding to the first mobile node and the step of determining the position of the first mobile node on the road according to the first road information and the second road information by the comparison device comprises:
extracting a portion of the first road information according to the position information of the first mobile node to obtain third road information centered on a third mobile node; and
checking whether the third road information centered on the third mobile node is the same as the second road information centered on the first mobile node, and if yes, determining that the position of the third mobile node is the same as the position of the first mobile node.

16. The method for determining the position of a mobile node as claimed in claim 15, wherein the first road information is obtained from road traffic information.

17. The method for determining the position of a mobile node as claimed in claim 15, wherein the first road information includes an identifier of the mobile node, a time, a GPS position and a road node information set, wherein the road node information set includes distribution state information of the neighboring mobile nodes within a sensing range of the RSU.

18. The method for determining the position of a mobile node as claimed in claim 17, wherein the first road information further includes an extension, and the extension includes speed information, type information and travel direction information corresponding to each of the neighboring mobile nodes.

19. The method for determining the position of a mobile node as claimed in claim 15, wherein the second road information includes an identifier of the mobile node, a time, a GPS position and a neighbor information set.

20. The method for determining the position of a mobile node as claimed in claim 19, wherein the neighbor information set includes a mobile node identifier, distance information, and angle information for each of the second mobile nodes corresponding to the mobile node.

21. The method for determining the position of a mobile node as claimed in claim 15, wherein the third mobile node is the closest mobile node to the first mobile node.

22. The method for determining the position of a mobile node as claimed in claim 15, wherein the step of determining the position of the first mobile node on the road according to the first road information and the second road information using a comparison device comprises:
taking fourth road information centered on a fourth mobile node that is closest to the first mobile node from the first road information as the road information to be compared when the third road information and the second road information are not the same, checking whether mobile node information corresponding to the second road information and mobile node information corresponding to the fourth road information are the same, and taking fifth road information centered on a fifth mobile node that is the second-closest to the first mobile node as the next road information to be compared when the mobile node information corresponding to the second road information and the mobile node information corresponding to the fourth road information are not the same.

23. The method for determining the position of a mobile node as claimed in claim 22, further comprising:
comparing mobile node information corresponding to the fifth road information and mobile node information corresponding to the second road information; and
determining that the position of the fifth mobile node is the same as the position of the first mobile node when the changes in distance, angle and distance in a past time of the fifth mobile node are closer to the changes in distance, angle and distance in a past time of the first mobile node.

24. The method for determining the position of a mobile node as claimed in claim 23, further comprising:
comparing mobile node information corresponding to the fifth road information and the mobile node information corresponding to the second road information to generate a first comparison result;
comparing extension information of the fifth mobile node and extension information of a sixth mobile node to generate a second comparison result when there are a fifth mobile node and a sixth mobile node included in the mobile nodes whose changes in distance, angle and distance in the past time are closer to the changes in distance, angle and distance in the past time of the first mobile node in the first comparison result; and
determining the position of the first mobile node according to the second comparison result.

25. The method for determining the position of a mobile node as claimed in claim 15, wherein the second road information is obtained by the mobile node as the center according to the relative distance distribution information of a neighboring mobile node.

26. A communication system, comprising:
a first mobile node and a plurality of second mobile nodes, wherein the second mobile nodes are adjacent to the first mobile node; and
a roadside unit (RSU), wherein the RSU, the first mobile node and the mobile nodes form a communication network on a road;
wherein the RSU obtains first road information by at least one sensor, receives second road information from a first mobile node by a communication device and determines the position of the first mobile node on the road according to the first road information and the second road information by a comparison device;
wherein the first road information provides absolute position distribution information associated with the first mobile node and the second mobile nodes, and the second road information provides relative position distribution information associated with the first mobile node and the second mobile nodes,
wherein the second road information further provides position information corresponding to the first mobile node and the step of determining the position of the first mobile node on the road according to the first road information and the second road information using the comparison device comprises:
extracting a portion of the first road information according to the position information of the first mobile node to obtain third road information, wherein the third road information centered on a third mobile node; and
checking whether the third road information centered on the third mobile node is the same as the second road information centered on the first mobile node, and if yes, determining that the position of the third mobile node is the same as the position of the first mobile node.

27. A roadside unit (RSU), used to communicate with a plurality of mobile nodes to form a communication network on a road, comprising:
at least one sensor;
a communication device, used for signal transmission and reception with the mobile nodes;
a comparison device; and
a processor, coupled to the sensor, the communication device, and the comparison device, used to obtain first road information by at least one sensor, receive second road information from a first mobile node of the mobile nodes by the communication device, and determine the position of the first mobile node on the road according to the first road information and the second road information by the comparison device;
wherein the first road information provides absolute position distribution information associated with the first mobile node and the second mobile nodes, and the second road information provides relative position distribution information associated with the first mobile node and the second mobile nodes,
wherein the second road information further provides position information corresponding to the first mobile node and the step of determining the position of the first mobile node on the road according to the first road information and the second road information using the comparison device comprises:
extracting a portion of the first road information according to the position information of the first mobile node to obtain third road information, wherein the third road information centered on a third mobile node; and
checking whether the third road information centered on the third mobile node is the same as the second road information centered on the first mobile node, and if yes, determining that the position of the third mobile node is the same as the position of the first mobile node.

28. A vehicle, used to communicate with a roadside unit (RSU) and a plurality of neighboring vehicles to form a communication network on a road, comprising:
at least one sensor;
a communication device, used for signal transmission and reception with the RSU and the neighboring vehicles;
a comparison device; and
a processor, coupled to the sensor, the communication device, and the comparison device, used to obtain first road information from the RSU by the communication device and receive second road information by the sensor and determine the position of the vehicle on the road according to the first road information and the second road information by the comparison device;
wherein the first road information provides absolute position distribution information associated with the vehicle and the neighboring vehicles, and the second road information provides relative position distribution information associated with the vehicle and the neighboring vehicles,
wherein the vehicle is a first mobile node and each of the neighboring vehicles is a second mobile node, the second road information further provides position information corresponding to the first mobile node and the step of determining the position of the first mobile node on the road according to the first road information and the second road information by the comparison device comprises:
extracting a portion of the first road information according to the position information of the first mobile node to obtain third road information centered on a third mobile node; and
checking whether the third road information centered on the third mobile node is the same as the second road information centered on the first mobile node, and if yes, determining that the position of the third mobile node is the same as the position of the first mobile node.

29. A method for determining the position of a mobile node, applied to a roadside unit (RSU), wherein the RSU and a plurality of mobile nodes form a communication network on a road, the method comprises:

obtaining, by at least one sensor, first road information, wherein the first road information provides absolute position distribution information associated with the mobile nodes;

receiving, by a communication device, second road information from a first mobile node of the mobile nodes, wherein the second road information provides relative position distribution information associated with the first mobile node and second mobile nodes adjacent to the first mobile node; and determining, by a comparison device, a position of the first mobile node on the road according to the first road information and the second road information, wherein the first road information includes first time information, and the step of determining the position of the first mobile node on the road according to the first road information and the second road information by the comparison device further comprises:

receiving a plurality of second road information, wherein each of the second road information includes second time information; and taking one of the second road information having the second time information which is closest to the first time information from the second road information or taking two of the second road information having at least two second time information which is close to the first time information from the two second road information to perform an interpolation and comparing the one or two of the second road information with the first road information so as to determine the position of the first mobile node on the road.

\* \* \* \* \*